United States Patent [19]

Miller et al.

[11] 4,391,686

[45] Jul. 5, 1983

[54] ACTINIC RADIATION CURABLE FORMULATIONS

[75] Inventors: Henry C. Miller, Laurel, Md.; Dennis D. Howard, Girard, Pa.

[73] Assignee: Lord Corporation, Erie, Pa.

[21] Appl. No.: 302,884

[22] Filed: Sep. 16, 1981

Related U.S. Application Data

[63] Continuation of Ser. No. 180,774, Aug. 25, 1980, abandoned, which is a continuation of Ser. No. 55,240, Jul. 6, 1979, abandoned.

[51] Int. Cl.$^3$ .................................................. C08F 8/00
[52] U.S. Cl. ........................... 204/159.15; 204/159.14; 204/159.16; 204/159.18; 204/159.19; 204/159.23
[58] Field of Search .............................. 427/44, 54.1; 204/159.14, 159.15, 159.16, 159.18, 159.19, 159.23

[56] References Cited

U.S. PATENT DOCUMENTS

| | | | |
|---|---|---|---|
| 4,008,341 | 2/1977 | Kehr | 427/44 |
| 4,017,652 | 4/1977 | Gruber | 427/54.1 |
| 4,097,994 | 7/1978 | Reaville et al. | 204/159.19 X |
| 4,133,723 | 1/1979 | Howard | 204/159.15 X |
| 4,169,167 | 9/1979 | McDowell | 427/54.1 |
| 4,171,252 | 10/1979 | Fantazier | 204/159.23 |
| 4,222,835 | 9/1980 | Dixon | 204/159.16 |

OTHER PUBLICATIONS

Henkstroeter et al., J. Am. Chem. Soc., 86 4537–4540 (1964).

*Primary Examiner*—Thurman K. Page
*Attorney, Agent, or Firm*—John A. Gazewood

[57] ABSTRACT

Energy-curable compositions can be cured in the presence of oxygen by exposure to actinic radiation employing as a photocatalyst system an essentially homogeneous admixture of (1) at least one compound which permits free radical polymerization through bimolecular photochemical reactions of the energy donor or energy transfer type, the hydrogen abstraction type, or by the formation of a donor-acceptor complex with monomers or additives leading to ionic or radical species; and (2) at least one photoinitiator selected from the group consisting of organic peroxide compounds which have as an identifying and critical feature at least one carbonyl group directly bonded through a carbon-oxygen bond to a peroxy oxygen atom.

16 Claims, No Drawings

ACTINIC RADIATION CURABLE FORMULATIONS

This is a continuation of application Ser. No. 180,774, filed Aug. 25, 1980 as a continuation of application Ser. No. 055,240, filed July 6, 1979, both now abandoned.

This invention relates to energy-curable compositions. More particularly, the invention relates to actinic radiation-curable compositions characterized by a reduced sensitivity to oxygen inhibition during the curing process.

The need to reduce solvent emissions and to conserve energy in industrial processes, such as in the paint, coating and ink industries, has resulted in an acceleration of the development of energy-curable compositions, which contain substantially no inert volatile solvents. Typically, energy-curable compositions are composed of various reactive components which cure through a free radical-induced addition polymerization mechanism. The reactive ingredients include relatively low molecular weight polymeric materials usually referred to as oligomer(s), and monomeric materials, and can include mixtures of such materials. Because cure is effected through free radical polymerization of reactive polymeric and monomeric materials which form the binder component of the composition, energy-curable formulations contain substantially no volatile solvents which must be evaporated during the cure cycle. From pollution, cost, safety and health points of view, the advantages of energy-curable compositions are readily apparent.

While these addition-polymerizable compositions can be cured by any free radical means, including redox catalyst systems and free radical generators, the term "energy-curable" generally encompasses those formulations which are curable by exposure to actinic radiation or ionizing radiation. Ionizing radiation generally possesses sufficient energy to itself initiate the free radical addition polymerization reaction, however, actinic radiation usually requires the presence of photoinitiation compounds which accelerate the polymerization rate. The function of the photoinitiation compounds is to absorb impinging energy in an amount sufficient to energize the photoinitiator compound(s) to an electronically excited state which is effective to induce free radical polymerization of the reactive polymeric and monomeric materials by one or more of several mechanisms, including direct energy transfer to a reactive site, by the formation of free radicals in a bi-molecular process such as hydrogen abstraction, through the formation of a donor-acceptor complex between monomers or additives leading to ionic or radical species, and by decomposing directly to free radicals capable of initiating polymerization. Once the polymerization reaction is induced by free radicals produced by the photoinitiator compounds, propagation of polymer growth advances through chain reaction. A particular deficiency of all compositions which cure via free radical addition polymerization is a sensitivity to oxygen inhibition during the curing process. Oxygen in the ground state is itself a radical and is highly reactive with other radicals. Thus, chain growth can be terminated by the oxygen radical, resulting in uncured or tacky surfaces. Oxygen inhibition is not as serious when cure is effected by exposure to high energy ionizing radiation or by exposure to either redox couple catalyst systems or thermally-activated free radical-generating agents. However, oxygen inhibition does materially affect compositions which are cured by exposure to actinic radiation, such as ultraviolet light, because the photoinitiator itself, when in the free radical state, can be capped and rendered ineffective.

The adverse effect of oxygen inhibition can be at least reduced by curing in an inert gaseous environment (nitrogen, argon, carbon dioxide, and the like). While effective, the use of inert gas environments is generally cumbersome and economically unattractive. Other methods which have been suggested for reducing the air inhibition effect on actinic energy-curable compositions include improved design of energy sources, increasing photoinitiator level, use of more reactive diluent systems, and use of natural and synthetic waxes. Except for the improved energy sources which must be proved out, the suggested methods directly affect ultimate properties of the cured systems and are not susceptible to widespread utilization. There remains a compelling need for means to reduce the sensitivity of actinic radiation-curable compositions to oxygen inhibition during the curing process, since the problem will increase in importance as the acceptance by industry of radiation-curable systems increases.

Gruber U.S. Pat. No. 4,017,652 discloses that oxygen inhibition of the photopolymerization of resins containing acrylic groups can be abated by employing a photocatalyst system containing (1) as a photosensitizer, at least one aromatic ketone or aromatic aldehyde which has a triplet energy in the range of from about 54 kilocalories per mole to about 72 kilocalories per mole and which promotes polymerization through bimolecular photochemical reactions of the energy donor type; and (2), as a photoinitiator, at least one aromatic ketone which generates a radical pair by way of unimolecular homolysis resulting from photoexcitation. A preferred photocatalyst system is benzophenone and isobutyl benzoin ether. The proposed photocatalyst systems are effective in reducing oxygen inhibition; however, they suffer from the deficiency that the time required for cure in oxygen is longer than the time required to cure the same formulation in an inert environment. The increased cure cycle is highly disadvantageous, because of its deleterious effect on many substrates, such as warping and charring; and because it negatively affects productivity.

Osborne et al. U.S. Pat. No. 3,759,807 disclose that the photopolymerization rate, that is, the cure rate, can be accelerated by employing combinations of certain organic carbonyl compounds, such as benzophenone, in combination with certain organic amine compounds, such as triethanolamine. However, these photocatalyst systems are essentially ineffective in providing both bulk and surface cure in oxygen-containing environments and, as with the Gruber systems, the systems are significantly slower in oxygen-containing environments than in inert atmospheres.

Howard U.S. Pat. No. 4,133,723 discloses that the nature of the polyol which is employed in forming energy-curable unsaturated urethane oligomers materially affects the photopolymerization rate of such oligomers. Howard discloses that the use of poly(alkylene oxide) polyols as precursor materials for unsaturated urethane oligomers affords energy-curable compositions which can be cured in air at rates approaching those obtainable in inert environments. Although a significant advance over Gruber, Howard film properties appear to be dependent on cure conditions and are often inferior to those obtained in inert atmospheres.

Continued research into the development of energy-curable compositions which can be cured by exposure to actinic radiation in the presence of air has resulted in the discovery that such compositions, in combination with photocatalyst systems comprising, (I), at least one compound which promotes free radical addition polymerization through bimolecular photochemical reactions of the energy donor or transfer type, of the hydrogen abstraction type, or by formation of a donor-acceptor complex with monomers or additives leading to ionic or radical species; and, (II), at least one organic compound containing at least one peroxide moiety, can be cured by exposure to actinic radiation in oxygen-containing environments at rates which are significantly more rapid than previously obtainable with ultimate film properties approaching those obtained when curing is effected in inert atmospheres. It was also discovered that (1) ultimate properties of the cured compositions can be enhanced by incorporating into the curable compositions at least one chain transfer agent and, (2), certain chain transfer agents are effective in further increasing rate of cure.

The present invention provides novel photocatalyst which are effective to promote free radical photopolymerizations under inert atmospheres and in oxygen-containing environments. The invention further provides novel photo-curable compositins which can be readily cured in either an inert atmosphere or in an oxygen-containing atmosphere by exposure to actinic radiation. Additionally, the invention provides processes for coating substrates which comprise applying to at least one surface of a substrate the energy-curable compositions of this invention and curing such coated substrate by exposure to actinic radiation to provide products having high gloss and low gloss finishes. The invention also contemplates articles of manufacture comprising substrates having a desired geometrical configuration and size having thereon a cured coating, said coating being formulated, applied and cured according to the concepts of the herein-described invention.

More particularly, the novel photocatalyst systems of the present invention comprise an essentially homogeneous admixture of, (I), at least one photosensitizer compound which promotes free radical polymerization through bimolecular photochemical reactions of the energy donor or transfer type, the hydrogen abstraction type, or by formation of a donor-acceptor complex with monomers or additives leading to ionic or radical species; and, (II), at least one organic peroxide which has as an identifying and critical feature at least one carbonyl group directly bonded through a carbon-oxygen bond to a peroxy oxgen atom, that is, an organic peroxide having at least one moiety having the structure

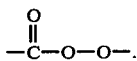

Photosensitizer compounds which are effective to promote free radical addition polymerization through bimolecular photochemical reactions of the energy donor or transfer type, hydrogen abstraction type or by formation of a donor-acceptor complex with monomers or additives leading to ionic or radical species are well-known. Particularly preferred photosensitizers, which are an essential first component of the photocatalyst systems employed in the practice of this invention, are aromatic ketones and aromatic aldehydes which can exist in a triplet state, especially such ketones and aldehydes which have a triplet energy in the range from 35 to 85, preferably 42 to 72, kilocalories per mole. Such photosensitizers are described in Gruber U.S. Pat. No. 4,017,652 and Osborne et al. U.S. Pat. No. 3,759,807, the disclosures of both patents being incorporated herein by reference. A small but representative listing of photosensitizers which are suitable for use in the present invention includes benzophenone, fluorenone, acetophenone, diethoxyacetophenone, dibutoxyacetophenone, bis(2-ethylhexyl)acetophenone, 4-vinylacetophenone, 4,4'-dimethylbenzophenone, 4,octylbenzophenone, 3-chlorobenzophenone, 4-iodobenzophenone, 3,4'-dichlorobenzophenone, 2-ethoxyfluorenone, anthraquinone, xanthone, 2-chloroxanthone, thioxanthone, methylthioxanthone, 4,4'-bis-(dimethylamino)diphenyl ketone and the like.

Organic peroxide compounds having at least one carboxyl group directly bonded through a carbon-oxygen bond to a peroxy oxygen atom which are suitable for use in the present invention are selected from the group consisting of organic peroxymonocarboxylic acids, monoperoxydicarboxylic acids, diperoxydicarboxylic acids, diacyl peroxides, peroxyesters of peroxymonocarboxylic acids, full and partial peroxyesters of monoperoxydicarboxylic acids and diperoxydicarboxylic acids, full and partial peroxyesters of peroxymonocarbonic acids and peroxydicarbonic acids and full and partial esters of peroxymonocarbamic and peroxydicarbamic acids. Suitable organic peroxides include saturated and unsaturated aliphatic and cycloaliphatic organic peroxides, aromatic peroxides and heterogenic peroxides, including both symetrical and unsymetrical compounds and including organic peroxides containing different groups such as an aromatic carbonyl group in combination with an aliphatic carbonyl group. Currently preferred are organic peroxide compounds in which at least one carbonyl group is directly bonded through a carbon-carbon bond to an aromatic nuclear carbon atom and also to a peroxy oxygen atom through a carbon-oxygen bond. A partial but representative listing of organic peroxide compounds which can be employed to form the photocatalyst systems of this invention include peroxyformic acid, peroxyacetic acid, peroxybenzoic acid, 2,4-dichloroperoxybenzoic acid, 12-hydroxyperoxystearic acid, monoperoxysebacic acid, diperoxysebacic acid, diacetyl peroxide, dicaprylyl peroxide, didecanoyl peroxide, diisobutyryl peroxide, diisononyl peroxide, dilauroyl peroxide, dipelargonyl peroxide, dipropanoyl peroxide, dibenzoyl peroxide, di(p-chlorobenzoyl) peroxide, di(2,4-dichlorobenzoyl) peroxide, succinic acid peroxide, benzoyl isobutyryl peroxide, acetyl isobutyryl peroxide, benzoyl acetyl peroxide, t-butyl peroxyacetate, t-butyl peroxybenzoate, t-butyl peroxy (2-ethylhexanoate), t-butyl peroxyisobutyrate, o,o-tert-butyl o-isopropyl monoperoxycarbonate, t-butyl peroxypivalate, 2,5-dimethyl-2,5-di(-benzoylperoxy) hexane, t-butyl peroxy (2-ethylbutyrate), 2,5-bimethyl-2,5-di(2-ethylhexanoylperoxy) hexane, di-t-butyl diperoxyphthalate, o,o-tert butyl o-hydrogen monoperoxy maleate, di-sec-butyl peroxydicarbonate, diisopropylperoxydicarbonate, dicyclohexyl peroxydicarbonate, t-butyl peroxycrotonate, N,N-diethyl t-butyl peroxycarbamate, and N,N-diphenyl t-butyl peroxycarbamate, acetyl cyclohexylsulfonyl peroxide, and t-butylazoformamide.

The photocatalyst systems of this invention comprise, in combination, an effective amount of an admixture comprising, (I), an effective amount of at least one photosensitizer as previously described and, (II), an effective amount of at least one organic peroxide having at least one carbonyl group directly bonded through a carbon-oxygen bond to a peroxy oxygen atom. Typically, the photocatalyst systems of the invention generally comprise from 25 to 99, preferably 35 to 99, and especially 60 to 99, percent by weight of photosensitizer with the organic peroxide component being present in amounts in the range from 1 to 75, preferably 1 to 65 and especially 1 to 40, percent by weight, said weight percentages being based on total weight of photocatalyst system. The amount of photocatalyst system present in the energy-curable compositions of this invention is at least an effective amount, with the photosensitizer usually being present in an amount in the range from 0.01 to 50, preferably 0.1 to 15, parts by weight per 100 parts by weight of reactive monomer, oligomer or mixture thereof, and the organic peroxide component usually being present in an amount in the range from 0.01 to 10, preferably 0.05 to 7, parts by weight per 100 parts by weight of reactive monomer, oligomer or mixture thereof.

The novel energy-curable compositions of this invention which are curable in inert and oxygen-containing atmospheres by exposure to actinic radiation comprise, in addition to the herein-described photocatalyst systems, at least one reactive monomer, at least one reactive polymer, or a mixture of such polymers and monomers, with the latter mixtures being currently preferred. Although such energy-curable compositions can contain minor amounts of inert solvents, they will generally be characterized by the substantial absence of inert materials, especially volatile solvents, other than pigment, fillers, flatting agents, flow control agents, and other nonreactive additives typically present in coating compositions. Preferably, reactive polymeric materials comprise at least one relatively low molecular weight polymer or oligomer.

Reactive oligomers which are preferentially employed in the energy-curable compositions of this invention include substantially any polymeric material characterized by the presence of at least one, preferably at least two, ethylenically unsaturated unit(s), and which is curable through a free radical-induced polymerization mechanism. Such polymeric materials will exhibit a molecular weight of at least 300, and preferably in the range of 600 to 4500, and preferably will have from 0.5 to 3 units of alpha, beta-olefinic unsaturation per 1000 units of molecular weight. Representative of such materials are vinyl, acrylic, substituted acrylic, allylic, fumaric, maleic, and the like compounds having at least one unit of ethylenic unsaturation, including ethylenically unsaturated polyesters, polyethers, polyacrylates and substituted polyacrylates, epoxies, polyurethanes, silicones, polyamines, polyamides, and the like. A preferred class of polymeric materials includes the acrylated resins, such as acrylated silicone oil, acrylated polyesters, acrylated polyurethanes, acrylated polyamides, acrylated polycaprolactones, acrylated soybean oil, acrylic and substituted acrylic resins, acrylated epoxies and acrylated urea resins. Currently, especially preferred oligomers include acrylated polyether, acrylated polyester, acrylated polyetheresters, acrylated polycaprolactones and acrylated polyurethane resins, with such acrylated resins which have the residue of at least one poly(alkylene oxide) polyol in the main chain being particularly preferred. Such ethylenically unsaturated materials, including their manufacture, are well-known, see Burlant et al. U.S. Pat. No. 3,509,234; Smith et al. U.S. Pat. No. 3,700,643; Boranian et al. U.S. Pat. No. 3,924,023 and Howard U.S. Pat. No. 4,133,723.

One such preferred group of polymeric materials comprise unsaturated urethane and analogous-to-urethane resins which are characterized by the presence of at least one ethylenically unsaturated unit having the structure $>C=C<$, said unsaturated resins comprising the reaction product of (I) at least one organic isocyanate compound characterized by the presence of at least two reactive isocyanate groups;

(II) from about 30 to 100 mol percent of at least one polymeric material characterized by the presence of at least two isocyanate-reactive active hydrogen groups;

(III) from about 70 to 0 mol percent of at least one monomeric chain-extending compound characterized by the presence of at least two isocyanate-reactive active hydrogen groups; and (IV) at least one addition-polymerizable unsaturated monomeric compound having a single isocyanate-reactive active hydrogen;

the mol percents of (II) and (III) being based on total mols of (II) and (III);

said isocyanate compounds (I) being present in an amount sufficient to provide an NCO:active hydrogen ratio greater than 1:1, preferably at least 1.05:1, and more preferably in the range 2.3–5:1 with respect to the active hydrogen groups; and said addition-polymerizable unsaturated monomeric compound (IV) being present in an amount sufficient to provide at least one mol or equivalent of active hydrogen group per mol of available isocyanate moiety. Such preferred unsaturated resins will have a residual reactive isocyanate moiety, based on total weight of the resin, of not more than one, preferably not more than 0.1, percent by weight. The ethylenically unsaturated unit is preferably a terminal group having the structure $CH_2=C<$. Such resins have the further characteristic features (a) the polymerizable ethylenically unsaturated group is separated from the main or backbone carbon-carbon chain by at least one, preferably at least two, urethane or analogous group(s) or combination of such groups;

(b) a molecular weight of at least 300, preferably 600 to 4500; and (c) the presence of 0.5 to 3 ethylenically unsaturated units per 1000 units of molecular weight.

An especially preferred group of unsaturated urethane resins comprises the reaction product of (I) at least one organic isocyanate compound having at least 2 isocyanate groups;

(II) at least one poly(alkyleneoxide) polyol; and (III) at least one unsaturated addition-polymerizable monomeric compound having a single isocyanate-reactive active hydrogen group;

there being present an excess of isocyanate compound with respect to the hydroxyl groups of said poly(alkyleneoxide)polyol;

said unsaturated addition-polymerizable monomeric compound having a single isocyanate-reactive hydrogen group being present in an amount sufficient to provide at least one mol equivalent of active hydrogen group with respect to isocyanate reactivity.

A second especially preferred group of unsaturated urethane resins comprises the reaction product of (i) at least one organic isocyanate compound having at least two isocyanate groups;

(ii) at least one polyetherester polyol having at least two hydroxyl groups, said polyetherester polyol comprising the reaction product of (a) from 3 to 100, preferably 40 to 100, mol percent of at least one poly(alkylene oxide)polyol having at least two hydroxyl groups;

(b) from 97 to zero mol percent of at least one polymeric non-poly(alkylene oxide)polyol having at least two hydroxyl groups;

(c) from 97 to zero mol percent of at least one monomeric polyol having at least two hydroxyl groups; and (d) from 97 to zero mol percent of at least one polyester which does not contain poly(alkylene oxide)polyol residues in its backbone;

said mol percents being based on total mols of precursor materials (II)(a)–(ii)(d); and (e) at least one organic polycarboxylic acid characterized by the presence of at least two carboxyl groups; and (iii) at least one unsaturated addition-polymerizable monomeric compound having a single isocyanate-reactive active hydrogen group;

there being present an excess of isocyanate compound with respect to the hydroxyl groups of said polyetherester polyol;

said unsaturated addition-polymerizable monomeric compound having a single isocyanate-reactive active hydrogen group being present in an amount sufficient to provide at least one molar equivalent of active hydrogen group with respect to isocyanate reactivity.

Another preferred group of polymeric materials comprise unsaturated oligomers having a main chain or backbone containing the residue of at least one poly(alkylene oxide)polyol. Such unsaturated oligomers comprise the reaction product of (I) at least one olefinically unsaturated compound having a single reactive moiety selected from the group consisting of carboxyl and hydroxyl; and (II) at least one organic compound having in its main chain a unit having the structure—YO)$_n$; wherein Y is a hydrocarbon chain having at least one carbon atom and which can be interrupted by one or more ether oxygen atoms; n is at least 2; said organic compound having at least two hydroxyl groups or two carboxyl groups; said organic compound being selected from the group consisting of (A) poly(alkylene oxide)polyhydroxy compounds;
(B) polyetherester polyhydroxy compounds; and
(C) polyetherester polycarboxy compounds;

said polyetherester compounds (B) and (C) comprising the reaction product of (i) from 3 to 100, preferably 50 to 100 mol percent of at least one poly(alkylene oxide)polyol having at least two hydroxyl groups;

(ii) from 97 to zero, preferably 60 to zero, mol percent of at least one polymeric non-poly(alkylene oxide)polyol, said polymeric polyol having at least two hydroxyl groups;

(iii) from 97 to zero, preferably 60 to zero, mol percent of at least one monomeric polyol having at least two hydroxyl groups; and (iv) from 97 to zero, preferably 60 to zero, mol percent of at least one polyester which does not contain poly(alkylene oxide)polyol residues in its backbone;

said mol percents being based on total mols of precursor materials (i)–(iv); and (v) at least one organic polycarboxylic acid characterized by the presence of at least two carboxyl groups, including anhydrides of such acids. Such oligomers have as characteristic features at least one ethylenically unsaturated group having the structure $>C=C<$, preferably $CH_2=C<$, said group preferably being terminally located; and having a main chain or backbone containing the residue of at least one poly(alkylene oxide)polyol, said main chain being separated from said ethylenically unsaturated group by at least one ester group. Preferably, all hydroxy or carboxyl moieties will be capped with an olefinically unsaturated compound having a single hydroxyl- or carboxyl-reactive moiety, which moiety depends upon the use of polyhydroxy poly(alkylene oxide), polyhydroxy polyetherester or polycarboxy polyetherester as a starting material. Like the unsaturated urethane resins, the unsaturated oligomers will preferably have molecular weights of at least 300, and especially in the range of 600 to 4500 and from 0.5 to 3 ethylenically unsaturated units per 1000 units of molecular weight.

The isocyanate compounds which are employed in forming unsaturated urethane polymers and oligomers which can be utilized in the energy curable compositions of the present invention can be any organic isocyanate compound having at least two free isocyanate groups. Included within the purview of suitable polyisocyanates are aliphatic, cycloaliphatic and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates and combinations such as alkylene cycloalkylene and alkylene arylene polyisocyanates, can be employed in the practice of the invention, including mixtures of such polyisocyanates.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4'4''-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, 1,6-cyclohexylene dimethylene diisocyanate, xylylene-1,4-diisocyanate, xylylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The aliphatic diisocyanate compounds are preferred, with 4,4'-methylene-bis(cyclohexyl isocyanate) being especially preferred.

Active hydrogen-containing polymeric precursor materials which can be employed in forming reactive unsaturated urethane polymers and oligomers which are suitable for use in the energy-curable compositions of this invention can be linear or branched and include any polymeric material having at least two isocyanate-reactive active hydrogen groups per molecule as determined by the Zerewitinoff method. Such polymeric materials are well-known and need not be discussed herein in any detail. Suitable active hydrogen-containing compounds include, without limitation, polyethers and polythioethers such as polyethylene glycol, polypropylene glycol, polytetramethylene glycol and the corresponding thiol analogues, hydroxy-terminated polyalkylene esters of aliphatic, cycloaliphatic and aromatic acids having at least two carboxyl groups, and including anhydrides of such acids; esters of polyhydric alcohols and hydroxy fatty acids; alkyd resins containing hydroxyl end groups; hydroxyl-terminated polybutadiene resins; hydroxylated acrylic and substituted acrylic resins; hydroxyl-terminated vinyl resins; polycaprolactones; polythiols; polyamine and polyamide resins and the like. Currently, hydroxyl-containing materials are preferred.

Especially preferred as active hydrogen-containing precursors for forming the especially preferred reactive unsaturated resins, including reactive unsaturated urethane resins, are poly(alkylene oxide) polyols and polyetherester polyols which have as an integral part of the backbone or main polymer chain the residue of at least one poly(alkylene oxide) polyol. The polyetherester polyol can be derived entirely from poly(alkylene oxide) polyols or can contain up to 97 mol percent, based on total hydroxyl content, of at least one non-poly(alkylene oxide) polyol monomeric or polymeric material having at least two hydroxy groups.

The poly(alkylene oxide) polyols having at least two hydroxyl groups which are employed in the practice of the invention are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 106 to about 4000, preferably about 106 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula $HO(CH_2—O—CH_2CH_2O)_nH$, where n is greater than 1. The alkylene can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus the poly(alkylene oxide)polyols will generally have from 2 to 6 hydroxyl groups, with such polyols having 2 hydroxyl groups being currently preferred. Preferred poly(alkylene oxide) polyols are poly(tetramethylene oxide) polyols, poly(propylene oxide) polyols, poly(ethylene oxide-propylene oxide) polyols, and poly(ethylene oxide) polyols, with the latter being especially preferred.

Another useful group of poly(alkylene oxide) polyols which can be employed in the practice of the invention are poly(alkylene etherthioether) compounds, which compounds have the identical formula as the poly(alkylene oxide) polyols except that some of the ether oxygens have been replaced with sulfur atoms. Such polyols are conveniently prepared by the reaction of a compound such as thiodiglycol with ethylene glycol in the presence of a catalytic amount of p-toluene sulfonic acid. Other polyethers, such as poly(alkylene oxide-arylene ether) polyols may be used.

Substantially any of the known monomeric alcohols having at least two hydroxyl groups, and polymeric non-poly(alkylene oxide) polyols having at least two hydroxyl and polyesters which do not contain poly(alkylene oxide) polyol residues in the backbone or main chain can be employed in combination with poly(alkylene oxide) polyols to form the polyetherester polyols which serve as precursor materials for the unsaturated urethane oligomers of the invention. Representative monomeric and polymeric polyols and polyesters which can optionally provide up to about 97 mol percent of hydroxyl functionality include 1,4-butanediol; 1,3-butylene glycol; 1,6-hexane diol; cyclohexane diol; 4,4'-methylene-bis-(cyclohexanol); glycerol; trimethylolpropane; 1,2,6-hexanetriol; erythritol; pentaerythritol; neopentyl glycol; polycaprolactone diols and triols; poly(butadiene) diols; hydroxylated poly(butadiene) dienes; poly(tetramethylene adipate) diol; poly(ethylene succinate) diol; poly (1,3-butylene sebacate) diol; and (1,3-butylene glycol/glycerine/adipic acid/isophthalic acid) diols and triols. Mixtures of such monomeric and polymeric compounds can be employed.

Polycarboxylic acids which may be employed in forming the polyetherester polyols which are suitable for use in the present invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyetherester include an aliphatic dicarboxylic acid as at least part of the acid component.

Essentially any monomeric compound having at least two isocyanate-reactive active hydrogen groups which is known to or can be expected to function as a chain-extender to increase molecular weight, introduce chain-branching, affect flexibility and the like in reactions between isocyanate compounds and compounds containing active hydrogen groups can be employed in forming the preferred unsaturated resins of the invention. Such chain-extending compounds are well-known in the art and require no detailed elaboration. Preferably, the active hydrogen groups of such chain-extending compounds will be selected from among hydroxyl, thiol, primary amine and secondary amine, including mixtures of such groups, with hydroxyl and primary amine being currently preferred. The chain-extending compounds will generally have molecular weights of at least 25, and preferably between 62 and 225. Especially preferred chain-extending compounds include aliphatic diols free of alkyl substitution and aliphatic triols having from 2 to 14 carbon atoms. Representative chain-extending compounds include water, ethylene glycol, 1,3-propane diol, 1,4-butane diol, 1,6-hexane diol, trimethylol propane, triethylene glycol, glycerol, 1,2-propane-bis(4-cyclohexyl amine), methane-bis(4-cyclohexyl amine), N,N'-dimethyl-o-phenylene diamine, 1,3-propane dithiol, monoethanol amine, and amino ethyl mercaptan.

Substantially any of the known monomeric alcohols having at least two hydroxyl groups, polymeric non-poly(alkylene oxide) polyol materials having at least two hydroxyl or carboxyl groups, and polyesters having at least two hydroxyl or carboxyl groups but which do not contain poly(alkylene oxide) polyol residues in the backbone or main chain can be employed in combination with poly(alkylene oxide) polyols to form the polyhydroxy and polycarboxy polyetherester compounds which serve as precursor materials for the unsaturated oligomers of this invention. Representative monomeric and polymeric polyhydroxy and polymeric polycarboxy compounds which can optionally provide up to about 97 mol percent with respect to the composition of the polyetherester starting materials include 1,4-butane diol; 1,3-butylene glycol; 1,6-hexane diol; 1,4-cyclohexane diol; 4,4'-methylene-bis-(cyclohexynol); glycerol; trimethylolpropane; 1,2,6-hexanetriol; erythritol; pentaerythritol; neopentyl glycol; polycaprolactone diols and triols; poly(butadiene) diols and dicarboxylic acids; hydroxylate poly(butadiene) diols and diacids; poly(1,3-butylene sebacate) diols and diacids; and (1,3-butylene glycol/glycerine/adipic acid-/isophthalic acid) poly-hydroxy materials and the corresponding polycarboxy materials. Mixtures of such monomeric and polymeric compounds can be employed.

Polycarboxylic acids which may be employed in forming the polyhydroxy and polycarboxy polyetherester materials which serve as precursor materials for the unsaturated oligomers of this invention consist primarily of monomeric carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, itaconic acid, trimellitic acid, tricarballylic acid, and other known polycarboxylic acids of varying types. It is currently preferred that the polyetherester include an aliphatic dicarboxylic acid as at least part of the acid component.

Suitable addition-polymerizable monomeric compounds having a single ethylenically unsaturated unit and a single isocyanate-reactive hydroxyl active hydrogen group which can be used in the preferred compositions of this invention include 2-hydroxyethyl acrylate, 3-hydroxy-propyl acrylate, 4-hydroxybutyl acrylate, 8-hydroxyoctyl acrylate, 12-hydroxydodecanyl acrylate, 6-hydroxyhexyl oleate, hydroxy neopentyl acrylate, hydroxyneopentyl linoleate, hydroxyethyl-3-cinnamyloyloxypropyl acrylate, hydroxyethyl vinyl ether, and the corresponding methacrylates, and allyl alcohol.

The polyetherester precursor materials for the unsaturated oligomers of the invention are prepared by conventional esterification techniques employing conventional apparatus. Esterification is generally effected in the presence of an inert atmosphere such as nitrogen. The poly(alkylene oxide) polyol and non-(polyalkylene oxide) polyol monomeric and polymeric materials are mixed in a suitable reactor and heated with agitation to from 60° C. to 100° C. or higher. The acid components are then added and heating with agitation continued at a temperature and rate such that the water of esterification can be rapidly removed, generally by distillation. When producing hydroxy-functional polyetherester materials, the esterification reaction is continued until the acid number is 10 or less and substantially all of the water of esterification and low-boiling impurities are removed. In the case of carboxy-functional polyetherester materials, the esterification reaction is terminated when there is reached an acid number corresponding to the desired equivalent weight of the resulting carboxy-functional polyether ester.

Ethylenically unsaturated carboxylic acids which are reacted with the above-described polyhydroxy poly(alkylene oxide) and polyhydroxy-polyetherester compounds include acrylic acid, methacrylic acid, crotonic acid, alpha-phenylacrylic acid, cyanoacrylic acid, methoxy acrylic acid, alpha-cyclohexylacrylic acid, and the like. There can also be used the unsaturated partial esters of unsaturated and saturated aliphatic, cycloaliphatic and aromatic polycarboxylic acids which are monobasic in nature, that is, the polycarboxylic partial ester has only one free reactive carboxyl group, which group is available for reaction with the hydroxyl groups of the poly(alkylene oxide) polyol and the polyhydroxy polyether ester. Such partial esters are readily formed by reacting polycarboxylic acids such as adipic acid, fumaric acid, maleic acid, alpha-chloromaleic acid, succinic acid, terephthalic acid, tetrahydroterephthalic acid and the like with an unsaturated monofunctional compound such as 2-hydroxyethyl acrylate, 2-hydroxyethyl methacrylate, the corresponding thiols and allyl alcohol and the like under conditions such that all carboxyl groups but one are esterified. Currently, the unsaturated aliphatic monocarboxylic acids having from 3 to 10 carbon atoms are preferred, particularly acrylic and methacrylic acids. It is understood that mixtures of carboxylic acids can be employed.

Substantially any known compound which has at least one polymerizable ethylenically unsaturated linkage or moiety and a single reactive hydroxyl group can be employed as a reactant with the herein-described carboxyl-terminated polyetheresters to form unsaturated oligomers suitable for use in the present invention. A particularly preferred class of such compounds are the hydroxyalkyl esters of acrylic and methacrylic acids representative of which are 2-hydroxyethyl acrylate, 2-hydroxyethyl methacrylate, 2-hydroxypropyl acrylate, 2-hydroxypropyl methacrylate, diethylene glycol acrylate, diethylene glycol methacrylate, 4-hydroxybutyl acrylate, 4-hydroxybutyl methacrylate, 3-chloro-2-hydroxypropylacrylate, 3-chloro-2-hydroxypropyl methacrylate, trimethylolpropane acrylate, trimethylolpropane dimethacrylate, pentaerythritol triacrylate and pentaerythritol trimethacrylate. Also useful are the diol esters of other unsaturated acids, particularly alpha, beta-olefinically unsaturated acids, including crotonic acid, tiglic acid, and undecylenic acid. The hydroxy-functional partial esters of diols and half-esters of dicarboxylic acids are also useful. Representative of these partial esters are 2-hydroxypropyl ethyl fumarate, 2-hydroxypropyl methyl itaconate, 2-hydroxyethyl fumarate, diethylene glycol ethyl maleate. Other unsaturated dicarboxylic acids whose half esters can be employed include, without limitation thereto, angelic acid, cinnamic acid, aconitic acid, citraconic acid, mesaconic and glutaconic acid. Another useful class of such ethylenically unsaturated compounds are unsaturated alcohols such as allyl alcohol, methallyl alcohol, methyl vinyl carbinol, beta-allyloxyethanol, para-allylbenzyl alcohol, crotyl alcohol, and unsaturated phenols such as ortho-, meta-, or para-hydroxystyrene and ortho- or para-allyl phenol. Other useful ethylenically unsaturated monohydroxy compounds which are equivalent to those herein recited will be readily apparent to the person of ordinary skill in the art.

The preferred unsaturated resins of the invention can be prepared by any of several reaction routes. For example, the isocyanate compound, the polymeric material having at least two active hydrogen groups, the additionpolymerizable monomeric compound having a single ethylenically unsaturated group and a single isocyanate-reactive active hydrogen group and, when used, the chain-extending compound can be simultaneously reacted together. Currently, it is preferred to form the unsaturated resins in two or more steps comprising (1) reacting the isocyanate compound, the polymeric material, and, if used, the chain-extending compound to provide an isocyanate-functional prepolymer and (2) reacting the prepolymer with the addition-polymerizable unsaturated monomeric compound having a single isocyanate-reactive active hydrogen group. The reaction is terminated at the desired state of viscosity, which will generally correspond to a molecular weight of at least 600, preferably 900 to 4500, which is usually a function of an end-use requirement. Any excess isocyanate moieties can be capped if desired or necessary by the addition of monofunctional chain-terminating agents, such as monoalcohols and monoamines, preferably having from one to 4 carbon atoms, and morpholine. Regardless of the process employed, it is preferred to conduct the reaction in its entirety in the presence of a diluent phase which is copolymerizable with the unsaturated resin product but is inert with respect to the manufacture of the resin.

Unsaturated resins suitable for use in the energy-curable composition of the invention can also be obtained by reacting, (1) at least one poly(alkylene oxide) polyol or polyhydroxy polyetherester, including mixtures thereof, and at least one compound containing at least one polymerizable ethylenically unsaturated moiety and a single reactive carboxyl group; and, (2), at least one polycarboxy polyetherester and at least one compound containing at least one polymerizable ethylenically unsaturated moiety and a single reactive hydroxyl group; under well-known esterifying conditions, for example, at a temperature in the range from 70°–250° C., for 3 to 20 hours, in the presence or absence of an esterification catalyst such as sulfuric acid, para-toluene sulfonic acid and methane sulfonic acid to result in esterification of the hydroxy groups with carboxyl groups. Preferably, the hydroxy- and carboxy-containing materials will be used in amounts sufficient to obtain a completely esterified unsaturated oligomer.

Reactive monomers which can be used alone or in combination with reactive polymers as reactive diluent for such polymers in the practice of this invention are well-known. Broadly such reactive monomer comprise at least one addition-polymerizable unsaturated monomeric compound which is polymerizable alone or copolymerizable with other addition-polymerizable unsaturated monomers or addition-polymerizable unsaturated polymers upon exposure to an appropriate energy source, such as actinic radiation. The reactive monomer can be monofunctional or polyfunctional, with respect to polymerizable moieties. A single polyfunctional reactive monomer can be used, as can mixtures thereof; or a combination of one or more monofunctional reactive reactive monomers and one or more polyfunctional reactive monomers can be used. Such combinations of mono- and polyfunctional reactive monomers are currently preferred. When employed as a reactive diluent system, the reactive monomers will typically comprise from 10 to 80, preferably 15 to 50, weight percent, based on total weight of reactive unsaturated polymeric material and reactive unsaturated monomer material, of the energy-curable compositions of the invention. Particularly preferred reactive monomer diluents are unsaturated addition-polymerizable monofunctional monomeric compounds selected from the group consisting of esters having the general formula

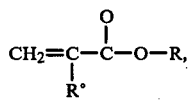

wherein $R^0$ is hydrogen or methyl, and R is an aliphatic or cycloaliphatic group having from 4 to 18 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctional and polyfunctional monomeric diluents which can be employed are styrene, methyl methacrylate, butyl acrylate, isobutyl acrylate, 2-phenoxy acrylate, 2-methoxyethyl acrylate, 2-(N,N-diethylamino)-ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. At the present time, it is preferred that the reactive diluent system contain at least one acrylic and/or methacrylic acid ester having at least 6 carbon atoms in the non-acid moiety, with such acrylic acid esters being preferred. Reactive diluent systems are well-known to those skilled in the art of radiation curing and the selection of an appropriate diluent system in any given instance is sufficiently encompassed by such knowledge as to require no further discussion here.

It has also been found that the inclusion of chain transfer agents in the energy-curable compositions employed in the practice of this invention can beneficially affect ultimate cured film properties. Substantially any of the known chain transfer agents can be so employed. Generally, such compounds, when utilized, will be employed at levels not exceeding about 15 parts by weight, per 100 parts of combined weight of unsaturated urethane oligomer and reactive diluent, and preferably will be employed in the range from about 0.1 to about 5 parts by weight. Representative chain transfer agents for addition polymerization reactions include benzene; toluene; ethylbenzene, isopropylbenzene; t-butyl benzene; cyclohexane; heptane; n-butyl chloride; n-butyl bromide; n-butyl iodide; n-butyl alcohol; n-butyl disulfide; acetone; acetic acid; chloroform; carbon tetrachloride; carbon tetrabromide; butylamine; triethylamine; t-butyl mercaptan; n-butyl mercaptan; tertiary aliphatic amines such as triethanolamine and t-butyl diethanolamine; 2-ethylhexane-1,3-dithiol; 1,10-decanedithiol; 1,2-ethanedithiol; 1,3-propanedithiol; 1,6-octanedithiol; 1,8-octanedithiol; 1,10-octadecanedithiol; m-benzenedithiol; bis-(2-mercaptoethyl) sulfide; p-xylylenedithiol; pentaerythritol tetra-7-mercaptoheptanoate; mercaptoacetic acid triglyceride; pentanethiol; dodecanothiol; glycol mercaptoacetate; ethyl mercaptoacetate; and esters of thioglycolic and mercaptopropionic acids. Preferred chain transfer agents include both monothiols and polythiols; the polythiols having a molecular weight in the range from about 95 to about 20,000 and having the general formula $$R^{10}(SH)_p,$$

wherein $R^{10}$ is a polyvalent organic moiety and p is at least 2, being especially preferred. Particularly preferred polythiols include glycerol trithioglycolate; pentaerythritol tetrathioglycolate; pentaerythritol tetrakis ($\beta$-mercaptopropionate) trimethylolpropane tris(thioglycolate); trimethylolpropane tris($\beta$-mercaptopropionate); ethylene glycol bis(thioglycolate); ethylene glycol bis($\beta$-mercaptopropionate) and poly(propylene oxide ether) glycol bis($\beta$-mercaptopropionate).

Preferably, the coating compositions of the invention will also contain from about 0.1 to about 10 parts by weight, per 100 parts combined weight of unsaturated oligomer and reactive ciluent, of acrylic acid.

The invention compositions can also include pigments, fillers, wetting agents, flow control agents, and other additives typically present in coating compositions. In some applications, the inclusion of minor amounts of inert solvents can be advantageous. Such additive materials are well-known to those skilled in the art and do not require further elaboration herein. Also well-known are the concentrations at which such additives are used.

The coating compositions of this invention are prepared by conventional methods such as blending. The compositions can be applied to wood, metal, fabric and plastic substrates in an economical and efficient manner using conventional industrial techniques and provide smooth, uniform films which are rapidly cured to dried films having a reduced gloss with excellent physical and chemical properties.

The coating compositions of this invention can be applied and cured by any of the conventional known methods. Application can be roll coating, curtain coating, airless spray, dipping or by any other procedure. The cure can be effected by exposure to actinic radiation, especially ultraviolet light radiation. The equipment utilized for curing, as well as the appropriate time for curing, and the conditions under which the curing is effected are well-known to those skilled in the art of radiation curing and do not require further elaboration herein. The herein described coating compositions are rapidly cured to hard mar-resistant films under inert atmospheres. The compositions containing the photocatalyst systems are especially suited for curing in the presence of molecular oxygen at a rate at least equivalent to that obtained under inert atmospheres. Generally, the cured films will provide a high gloss finish. Low gloss finishes can be obtained by employing the herein described compositions in the process of Hahn U.S. Pat. No. 3,918,393, the disclosure of which is incorporated herein by reference. Compositions containing the novel photocatalyst systems of the invention are especially suited for obtaining low gloss finishes by the recently developed "Gradient Intensity Cure" method. According to this method, a flatted or low gloss finish is produced by subjecting the photopolymerizable composition to actinic light in an oxygen-containing atmosphere at a first intensity level and a first exposure time until the composition is completely cured except for the surface thereof and subsequently subjecting such composition having such uncured surface to actinic light at a second intensity level and a second exposure time to completely cure said surface, wherein said combination of second intensity and second exposure time is selected from the group consisting of (i) said second intensity is substantially equal to said first intensity and said second exposure time is greater than said first exposure time;

(ii) said second intensity is greater than said first intensity, and said second exposure time is substantially equal to said first exposure time;

(iii) said second intensity is greater than said first intensity, and said second exposure time is less than said first exposure time; and (iv) said second intensity is greater than said first intensity, and said second exposure time is greater than said first exposure time.

In accordance with the "Gradient Intensity Cure" method, the coating is first irradiated by actinic light in an oxygen-containing atmosphere, with air being the preferred atmosphere, at a first intensity level which is sufficient to energize the photoinitiator component of the photocatalyst system and initiate free radical polymerization of the bulk of the coating. While actinic radiation has an emission spectra which is sufficient to energize also the photosensitizer component of the photocatalyst system, both the amount of photosensitizer and the first intensity level are selected to ensure that the free radicals produced from such energizing of the photosensitizer are insufficient to override completely oxygen inhibition at the film surface. The surface of the coating is thus inhibited at the first intensity level by the oxygen present in the curing atmosphere at least to the extent that the surface is incompletely polymerized and remains wet to the touch while the bulk or underneath portion of the coating is cured to a hard polymer.

Following the exposure at the first intensity level, the wet film is irradiated by actinic light in an oxygen-containing atmosphere, with air again being the preferred atmosphere, at a second intensity level which is not only higher than that initially employed but also is effective to energize the photosensitizer component of the photocatalyst system. This second intensity level must be sufficiently high to ensure that the gross amount of free radicals resulting from such energization of photosensitizer is effective to override oxygen inhibition at the film surface and initiate free radical polymerization of and effect complete cure of the wet surface layer. Properties such as stain, solvent and abrasion resistance are substantially identical in comparison to formulations cured according to the two-stage air-inert environment process of Hahn U.S. Pat. No. 3,918,393, or cured in a single stage at constant intensity in either an inert atmosphere or an oxygen-containing atmosphere.

The actinic energy which is preferred for curing the herein-described coating composition is ultra violet light or irradiation in the near and far ultraviolet spectrum, i.e., having wavelengths in the range of 200 nm (nanometers) to 400 nm. Various suitable sources of such ultraviolet light or radiation are available in the art including by way of example, mercury vapor arc lamps, carbon arcs, plasma arc torches, ultraviolet lasers, and pulsed xenon lamps, with medium pressure mercury arc vapor lamps being currently preferred.

The invention is illustrated in greater detail by the following Examples, but these examples are not to be construed as limiting the present invention. All parts, percentages and the like are in parts by weight, unless otherwise indicated.

EXAMPLE A

Several unsaturated resin syrups are prepared as follows:

Syrup A: To a reaction vessel equipped with stirrer, condenser, thermometer and gas inlet there is charged one equivalent of poly(tetramethylene oxide) diol (650 mw), 3 equivalents of 4,4'-methylene-bis(cyclohexyl isocyanate) and 15 percent by weight based on total weight of charge, of 2-ethylhexyl acrylate. The contents of the reaction vessel are heated to 70° C. under dry air and 0.1 weight percent dibutyl tin dilaurate are added. The reaction is continued until substantially all of the hydroxy groups are consumed. Two equivalents of 2-hydroxyethyl acrylate are added to the reaction vessel and the reaction is continued until substantially all of the isocyanate groups are consumed. The reaction vessel is cooled to room temperature. There is obtained a viscous syrup of acrylated urethane oligomer in 2-ethylhexyl acrylate reactive monomer diluent at a resin solids concentration of 86.5 percent by weight. The unsaturated oligomer has a molecular weight ca 1400 and approximately 1.4 units vinyl unsaturation per 1000 units of molecular weight.

Syrup B: A reaction vessel equipped with stirrer, condenser, Dean Stark trap and thermometer is charged with one equivalent of poly(propylene oxide copolymer) diol (mw 620), 3 equivalents of 4,4'-methylene-bis(cyclohexyl isocyanate). The contents of the vessel are reacted following a procedure similar to that employed in making Syrup A. The resulting isocyanate-functional olygomer is contacted with 2.2 equivalents of 2-hydroxyethyl acrylate to afford a syrup of fully-capped addition-polymerization acrylated polyurethane oligomer in 2-ethylhexyl acrylate reactive monomer diluent at 70 percent resin solids concentration. The unsaturated oligomer has a molecular weight ca. 1400 and approximately 1.4 units of vinyl unsaturation per 1000 units of molecular weight.

Syrup C: Following the procedure employed in preparing Syrup A, one equivalent of poly(propylene oxide) diol (mw 710), 3 equivalents 4,4'-methylene-bis(cyclohexyl isocyanate) are reacted in 2-ethylhexyl acrylate. The resulting isocyanate-functional prepolymer is reacted with 2.2 equivalents 2-hydroxyethyl acrylate, to provide a viscous syrup of acrylourethane oligomer in 2-ethylhexyl acrylate reactive monomer diluent at 70 percent resin solids concentration. The unsaturated oligomer has a molecular weight ca. 1500 and approximately 1.3 units of vinyl unsaturation per 1000 units of molecular weight.

Syrup D: A reactor similar to that employed in making Syrup A is charged with one equivalent of polyhydroxy polyester [1,3-butylene glycol/glycerine/adipic acid (90)/isophthalic acid (10) condensation product] having a hydroxyl functionality of 2.3, 3.75 equivalents of 4,4'-methylene-bis(cyclohexyl isocyanate) and 30 weight percent, based on total weight of charge, of 2-ethylhexyl acrylate. The resulting isocyanate-functional oligomer is fully capped with 2-hydroxyethyl acrylate to afford a syrup of addition-polymerizable unsaturated urethane oligomer in 2-ethylhexyl acrylate reactive monomer diluent at 70 percent resin solids content. The unsaturated oligomer has a molecular weight ca. 1300 and approximately 1.8 units of vinyl unsaturation per 1000 units of molecular weight.

EXAMPLE B

Using Syrup A (PTMO[a] acrylourethane at 86.5% resin solids in 2-ethylhexyl acrylate) of Example A, energy-curable compositions are prepared according to the following schedule:

[a]PTMO is poly(tetramethylene oxide) polyol

| Formulation | B-1 | B-2 | B-3 | B-4 | B-5 | B-6 | B-7 | B-8 | B-9 | B-10 |
|---|---|---|---|---|---|---|---|---|---|---|
| Ingredients, Parts by Weight (PBW) | | | | | | | | | | |
| Syrup A | 96.0 | 96.9 | 96.5 | 96.0 | 97.9 | 97.5 | 97.0 | 98.9 | 98.5 | 98.0 |
| Benzophenone | 3 | 3 | 3 | 3 | 2 | 2 | 2 | 1 | 1 | 1 |
| Benzoin isobutyl ether | 1 | — | — | — | — | — | — | — | — | — |
| Benzoyl peroxide | — | 0.1 | 0.5 | 1.0 | 0.1 | 0.5 | 1.0 | 0.1 | 0.5 | 1.0 |

The formulations are applied by direct roll coater to aluminum panels at a 5 mm wet film thickness. The coatings are subjected to ultraviolet irradiation in air, using a power source consisting of one medium pressure mercury vapor lamp at a power output of 78.7 W/cm. The maximum cure speeds, that is, the maximum speed at which a 5 mm thick film on aluminum will cure in air with one pass through the radiation source, is as follows:

| Formulation | B-1 | B-2 | B-3 | B-4 | B-5 | B-6 | B-7 | B-8 | B-9 | B-10 |
|---|---|---|---|---|---|---|---|---|---|---|
| Maximum cure speed, mm/sec., with one | | | | | | | | | | |

-continued

| Formulation | B-1 | B-2 | B-3 | B-4 | B-5 | B-6 | B-7 | B-8 | B-9 | B-10 |
|---|---|---|---|---|---|---|---|---|---|---|
| lamp at 78.7 W/cm | 508 | 508 | 914 | 914 | 508 | 508 | 508 | <126 | Gel | Gel |

The data are demonstrative of the utility of the present invention. The data also demonstrate that significantly increased cure speeds can be obtained using the photoinitiation systems of the invention, in comparison to that obtained by a preferred photoinitiation system (Formulation B-1) of Gruber U.S. Pat. No. 4,017,652. The data also show, (Formulations B-1 and B-5) that a photoinitiation system level as low as 2 wt % benzophenone/0.1 wt % benzoyl peroxide provides cure rates comparable to those provided by Gruber, supra, at a photoinitiation system level of 3 wt % benzophenone/1 wt % benzoin isobutyl ether.

EXAMPLE C

Using Syrup B (PPO-EO[a] acrylourethane at 70% resin solids in 2-ethylhexyl acrylate) of Example A, energy-curable compositions are prepared as follows:

a = Propylene oxide-ethylene oxide copolymer

| Formulation | C-1 | C-2 | C-3 | C-4 | C-5 | C-6 |
|---|---|---|---|---|---|---|
| Ingredients, PBW | | | | | | |
| Syrup B | 96 | 96 | 96 | 96 | 96 | 96 |
| Benzophenone | 3.0 | 3.5 | 3.9 | 3.0 | 3.5 | 3.9 |
| Benzoin isobutyl ether | — | — | — | 1.0 | 0.5 | 0.1 |
| Benzoyl peroxide | 1.0 | 0.5 | 0.1 | — | — | — |

The formulations are applied by direct roll coater to aluminum panels at a 5 mm wet film thickness. The coatings are subjected to ultraviolet irradiation in air, using a power source consisting of two mercury vapor lamps at a power output of 78.7 W/cm. The maximum cure speed and ultimate film properties are reported in the following Table:

| Formulation | C-1 | C-2 | C-3 | C-4 | C-5 | C-6 |
|---|---|---|---|---|---|---|
| Maximum cure speed, mm/sec. with 2 lamps @ 78.7 W/cm | 254 | 254 | 508 | 127 | 254 | 254 |

-continued

| Formulation | C-1 | C-2 | C-3 | C-4 | C-5 | C-6 |
|---|---|---|---|---|---|---|
| Fomulation stability at 52 C., days | 1 | 5 | >62 | >62 | >62 | >62 |
| Physical properties | | | | | | |
| Cure speed  Property | | | | | | |
| 127 mm/sec.  $T_b$, MP.a | 15.17 | 12.40 | 11.72 | 8.27 | 6.80 | 7.58 |
|              $E_b$, % | 45[b] | 35[b] | 45[b] | 45[b] | 40[b] | 35[b] |
| 254 mm/sec.  $T_b$, MP.a | 15.17 | 13.79 | 8.96 | 5.52 | — | 4.14 |
|              $E_b$, % | 40[b] | 40[b] | 40[b] | 40[c] | — | 50[b] |
| 508 mm/sec.  $T_b$, MP.a | 10.34 | — | 10.35 | 3.45 | — | 3.45 |
|              $E_b$, % | 50[c] | — | 40[b] | 40[c] | — | 40[c] |
| 762 mm/sec.  $T_b$, MP.a | — | — | 6.9 | 3.45 | — | — |
|              $E_b$, % | — | — | 50[c] | 40[c] | — | — |

$T_b$ = Tensile strength at break;
$E_b$ = Elongation at break
[b] = Surface cured;
[c] = Surface not cured The data demonstrate that coating compositions prepared in accordance with the invention (Formulations C-1, 2 and 3) cure at higher speeds in air and develop stronger film properties at each cure speed evaluated than do compositions prepared according to a preferred embodiment of Gruber, supra, (Formulations C-4, 5 and 6).

EXAMPLE D

Several formulations are prepared from Syrup B. The formulations are coated onto aluminum panels, cured and evaluated in a manner substantially identical to that employed in Example C. The formulations, cure speeds and film properties are reported in Table D. As the data demonstrate, coating compositions prepared in accordance with the invention cure at higher speeds in air and develop stronger film properties at each speed evaluated than do compositions prepared according to a preferred embodiment of Gruber, supra. The data of this Example and that of Example C demonstrate the effect of variations in the composition of the photoinitiation system on cure speed and ultimate film properties.

TABLE D

| Formulations | D-1 | D-2 | D-3 | D-4 | D-5 | D-6 | D-7 | D-8 | D-9 |
|---|---|---|---|---|---|---|---|---|---|
| Syrup B | 96 | 96 | 96 | 96 | 96 | 96 | 96 | 96 | 96 |
| Benzophenone | 3.9 | 4.9 | 5.9 | 6.9 | 3 | 3.7 | 4.7 | 5.7 | 6.7 |
| Benzoyl peroxide | 0.1 | 0.1 | 0.1 | 0.1 | — | 0.3 | 0.3 | 0.3 | 0.3 |
| Benzoin isobutyl ether | — | — | — | — | 1 | — | — | — | — |
| Maximum cure speed, mm/sec., with 2 lamps @ 78.7 W/cm. | 254 | 254 | 508 | 762 | 254 | 254 | 508 | 762 | 1016 |
| Formulation stability @ 52° C., days | >52 | >52 | >52 | >52 | >52 | 24 | 24 | 24 | 32 |
| Properties | | | | | | | | | |
| Cure speed  Property | | | | | | | | | |
| 127 mm/sec  $T_b$MP.a | 12.42 | 11.73 | 9.66 | 11.73 | 8.25 | 13.11 | 13.80 | 11.04 | 11.04 |
|              $E_b$ % | 40[a] | 40[a] | 40[a] | 45[a] | 45[a] | 35[a] | 40[a] | 35[a] | 35[a] |
| 254 mm/sec  $T_b$MP.a | 11.73 | 11.04 | 8.97 | 8.97 | 6.90 | 11.73 | 12.42 | 12.42 | 11.73 |
|              $E_b$ % | 50[a] | 40[a] | 40[a] | 40[a] | 40[a] | 35[a] | 35[a] | 40[a] | 40[a] |
| 508 mm/sec  $T_b$MP.a | 8.28 | 8.28 | 6.90 | 7.59 | 3.45 | 11.04 | 11.04 | 10.35 | 9.66 |
|              $E_b$ % | 40[b] | 35[b] | 40[a] | 40[a] | 40[b] | 40[b] | 40[a] | 40[a] | 40[a] |
| 762 mm/sec  $T_b$MP.a | — | — | 6.21 | 6.90 | — | — | 7.59 | 9.66 | 8.97 |
|              $E_b$ % | — | — | 40[b] | 35[a] | — | — | 30[b] | 35[a] | 40[a] |
| 1016 mm/sec  $T_b$MP.a | — | — | — | 5.52 | — | — | — | 8.97 | 8.28 |

TABLE D-continued

| Formulations | D-1 | D-2 | D-3 | D-4 | D-5 | D-6 | D-7 | D-8 | D-9 |
|---|---|---|---|---|---|---|---|---|---|
| $E_b$ % | — | — | — | 35[b] | — | — | — | 45[b] | 40[a] |

[a] = Surface cured;
[b] = Surface not cured.

EXAMPLE E

Several formulations are prepared from Syrup A. The formulations are coated onto aluminum panels and evaluated in a manner substantially identical to that employed in Example C, except that cure is effected both in air and under nitrogen. As the data show, formulations prepared in accordance with the invention cure at a faster rate under nitrogen than in air, with the air-cured films generally having stronger ultimate film properties. On the other hand, formulations prepared according to the invention cure in air at substantially the same rate as the cure under nitrogen for formulations prepared according to a preferred embodiment of Gruber, supra; while providing stronger ultimate film properties. The formulations and results are reported in Table E.

TABLE E

| Formulation | | E-1 | E-2 | E-3 | E-4 |
|---|---|---|---|---|---|
| Syrup A | | 96 | 96 | 96 | 96 |
| Benzophenone | | 3.9 | 3.9 | 3 | 3 |
| Benzoyl peroxide | | 0.1 | 0.1 | — | — |
| Benzoin isobutyl ether | | — | — | 1 | 1 |
| Atmosphere | | Air | $N_2$ | Air | $N_2$ |
| Maximum cure speed, mm/sec., with 2 lamps @ 78.7 W/cm | | 762 | 1016 | 508 | 762 |
| Properties | | | | | |
| Cure speed | Property | | | | |
| 127 mm/sec. | $T_b$MP.a | 14.49 | 12.42 | 11.04 | 11.04 |
| | $E_b$, % | 65[a] | 50[a] | 50[a] | 53[a] |
| 254 mm/sec. | $T_b$MP.a | 14.49 | 11.04 | 11.04 | 9.66 |
| | $E_b$, % | 65[a] | 55[a] | 65[a] | 60[a] |
| 508 mm/sec. | $T_b$MP.a | 11.73 | 9.66 | 6.21 | 6.90 |
| | $E_b$, % | 60[a] | 55[a] | 65[a] | 65[a] |
| 762 mm/sec. | $T_b$MP.a | 11.04 | 11.73 | 6.12 | 5.52 |
| | $E_b$, % | 60[a] | 65[a] | 80[b] | 80[a] |
| 1016 mm/sec. | $T_b$MP.a | 11.04 | 6.90 | — | — |
| | $E_b$, % | 65[b] | 50[a] | — | — |

[a] = Surface cured;
[b] = Surface not cured.

EXAMPLE F

A series of energy-curable compositions are prepared according to the following schedule:

| Formulation | F-1 | F-2 | F-3 | F-4 | F-5 | F-6 |
|---|---|---|---|---|---|---|
| Ingredients, PBW | | | | | | |
| Syrup A | 96 | 96 | 93 | — | — | — |
| Syrup B | — | — | — | 96 | 96 | 93 |
| Syrup C | — | — | — | — | — | — |
| Syrup D | — | — | — | — | — | — |
| Benzophenone | 3 | 3.9 | 6.7 | 3 | 3.9 | 6.7 |
| Benzoin isobutyl ether | 1 | — | — | 1 | — | — |
| Benzoyl peroxide | — | 0.1 | 0.3 | — | 0.1 | 0.3 |

| Formulation | F-7 | F-8 | F-9 | F-10 | F-11 | F-12 |
|---|---|---|---|---|---|---|
| Ingredients, PBW | | | | | | |
| Syrup A | — | — | — | — | — | — |
| Syrup B | — | — | — | — | — | — |
| Syrup C | 96 | 96 | 93 | — | — | — |
| Syrup D | — | — | — | 96 | 96 | 93 |
| Benzophenone | 3 | 3.9 | 6.7 | 3 | 3.9 | 6.7 |
| Benzoin isobutyl ether | 1 | — | — | 1 | — | — |
| Benzoyl peroxide | — | 0.1 | 0.3 | — | 0.1 | 0.3 |

The formulations are applied by direct roll coater to aluminum panels at a 5 mm wet film thickness. The coatings are subjected to ultraviolet irradiation in air, using a power source consisting of two medium pressure mercury vapor lamps at a power output of 78.7 W/cm per lamp. The maximum cure speed and ultimate film properties for each formulation is reported in the following Table:

| Formulation | F-1 | F-2 | F-3 | F-4 | F-5 | F-6 |
|---|---|---|---|---|---|---|
| Maximum cure speed, mm/sec., with 2 lamps @ 78.7 W/cm | 508 | 1016 | >1524 | 254 | 508 | 762 |
| Properties | | | | | | |
| $T_b$ MP.a | 11.73 | 11.04 | 13.11 | 8.97 | 13.80 | 11.73 |
| $E_b$, % | 55 | 35 | 50 | 45 | 45 | 40 |

| Formulation | F-7 | F-8 | F-9 | F-10 | F-11 | F-12 |
|---|---|---|---|---|---|---|
| Maximum cure speed, mm/sec., with 2 lamps @ 78.7 W/cm | 127 | <127 | 127 | <127 | 127 | 127 |
| Properties | | | | | | |
| $T_b$ MP.a | 11.73 | 15.87 | 13.80 | 17.94 | 17.94 | 16.56 |
| $E_b$, % | 65 | 40[a] | 40 | 50 | 30 | 35 |

[a] = Surface not cured.

The data demonstrate that formulations prepared according to the invention can be cured at faster rates to provide higher ultimate film properties than can the control formulations which contain a benzophenone/benzoin isobutyl ether photoinitiation system.

EXAMPLE G

Several unsaturated resin syrups are prepared as follows:

Acrylated Polyester AP-I: A reaction vessel is charged under a nitrogen atmosphere with 105 g trimethyol propane, 49 g neopentyl glycol, 190 g adipic acid, 106 g isophthalic acid and 207 g, 1,4-cyclohexane dimethanol. The reaction mixture is heated to 242° C. for three hours and 67 ml water are removed. 600 g or the resulting hydroxyl-terminated polyester, 173 g acrylic acid, 193 g mineral spirits, 0.08 g methoxyhydroquinone and 4 g methane sulfonic acid are heated at 100° C. under a dry air sweep for ten hours. 44 ml water are removed in an azeotrope with the mineral spirits. The contents of the reaction vessel are stripped of solvent and cooled. There is obtained a clear viscous syrup of acrylated polyester oligomer.

Acrylated Polyetherester APEE-I: Following the procedure employed in forming AP-I, 177 g poly(tetraethylene oxide) polyol, 127 g 1,4-cyclohexane dimethanol, 89 g trimethylolpropane, 172 g adipic acid, and 98 g isophthalic acid are reacted for 9 hours, during which time 63 ml of water are removed. 600 g of the resulting hydroxyl-functional polyetherester, 149 g acrylic acid, 100 ppm methoxyhydroquinone, 100 ppm phenothiazine, 3.6 g methane sulfonic acid and sufficient hexane to maintain a reflux at 100° C. is reacted for 14 hours, during which time 25 ml of water are removed. The hexane is vacuum stripped from the reaction product. There is obtained a clear viscous syrup of acrylated polyetherester.

Acrylated Polyether APE-I: 186 g poly(tetraethylene oxide)polyol, 150 g acrylic acid, 100 ppm methoxyhydroquinone, 100 ppm phenothiazine, 3.6 g methane sulfonic acid and sufficient hexane to maintain a reflux at 100° C. is reacted for 14 hours, during which time 36 ml water are removed. The hexane is vacuum stripped from the reaction product. There is obtained a clear viscous syrup of acrylated polyether.

Syrups AP-I, APEE-I, and APE-I are employed to prepare energy-curable compositions as follows:

| Formulations | G-1 | G-2 | G-3 | G-4 | G-5 | G-6 |
|---|---|---|---|---|---|---|
| Ingredients, PBW | | | | | | |
| Syrup AP-I | 96 | 96 | 96 | 96 | — | — |
| Syrup APEE-1 | — | — | — | — | 96 | 96 |
| Syrup APE-I | — | — | — | — | — | — |
| Benzophenone | 3.9 | 3.9 | 3.9 | 3.9 | 3.9 | 3.9 |
| t-Butylperoxybenzoate | 0.1 | — | — | — | 0.1 | — |
| t-Butylperoxymaleic acid | — | 0.1 | — | — | — | 0.1 |
| Di-t-butyl diperoxyphthalate | — | — | 0.1 | — | — | — |
| 2,5-Dimethyl-2,5-bis(benzoylperoxy) hexane | — | — | — | 0.1 | — | — |

| Formulations | G-7 | G-8 | G-9 | G-10 | G-11 | G-12 |
|---|---|---|---|---|---|---|
| Ingredients, PBW | | | | | | |
| Syrup AP-I | — | — | — | — | — | — |
| Syrup APEE-I | 96 | 96 | — | — | — | — |
| Syrup APE-I | — | — | 96 | 96 | 96 | 96 |
| Benzophenone | 3.9 | 3.9 | 3.9 | 3.9 | 3.9 | 3.9 |
| t-Butylperoxybanzoate | — | — | 0.1 | — | — | — |
| t-Butylperoxymaleic acid | — | — | — | 0.1 | — | — |
| Di-t-butyl diperoxyphthalate | 0.1 | — | — | — | 0.1 | — |
| 2,5-Dimethyl-2,5-bis(benzoylperoxy) hexane | — | 0.1 | — | — | — | 0.1 |

The formulations are coated onto aluminum panels, vinyl asbestos tile and vinyl sheet goods at 1.5 mil wet film thickness and cured in air using one 78.7 W/cm medium pressure mercury vapor lamp at a transport speed of 508 mm/sec. Formulations G-1, 2, and 3 cure to a tack-free, mar-resistant surface finish in two passes. Formulations G-5, 6, 7, 8, 9, 10, 11, and 12 cure to a tack-free, mar-resistant surface finish in one pass.

What is claimed is:

1. A coating composition comprising
   (a) a free radical-polymerizable material selected from the group consisting of monomers, polymers and mixtures thereof; and
   (b) a photocatalyst system consisting essentially of
      (i) as a photosensitizer compound, benzophenone; and
      (ii) at least one photoinitiator selected from the group consisting of organic compounds characterized by the presence of at least one carbonyl group directly bonded through a carbon-oxygen bond to a peroxy oxygen atom.

2. A coating composition according to claim 1 containing from 0.01 to 30 parts by weight, per 100 parts by weight of free-radical-polymerizable material of at least one thiol compound selected from the group consisting of monothiols and polythiols, said polythiols having a molecular weight in the range from 95 to 20,000 and having the formula $$R^{10}(SH)_p;$$

wherein $R^{10}$ is a polyvalent organic moiety and p is at least 2.

3. A coating composition according to claim 1 wherein said free radical-polymerizable material comprises
   (a) a reactive polymeric characterized by the presence of at least one ethylenically unsaturated unit; and
   (b) at least one unsaturated free radical-induced addition-polymerizable monomeric compound which is copolymerizable with said reactive polymeric material.

4. A coating composition according to claim 3 wherein
   (a) said reactive polymeric material is selected from the group consisting of ethylenically unsaturated polyesters, polyethers, polyacrylates and substituted polyacrylates, epoxies, polyurethanes, silicones, polyamines and polyamides; and
   (b) said unsaturated free radical-induced addition-polymerizable monomeric compound comprises from 50 to 100 percent by weight, based on total weight of such monomeric compound, of at least one ester having the formula $$CH_2=C-\underset{R^8}{\overset{\overset{O}{\|}}{C}}-O-R^9$$

wherein $R^8$ is hydrogen or methyl and $R^9$ is an aliphatic or cycloaliphatic group having from 6 to 18 carbon atoms.

5. A coating composition according to claim 4 containing from 0.01 to 30 parts by weight, per 100 parts by weight of free-radical-polymerizable material, of at least one thiol compound selected from the group consisting of monothiols and polythiols, said polythiols having a molecular weight in the range from 95 to 20,000 and having the formula $$R^{10}(SH)_p;$$

wherein $R^{10}$ is a polyvalent organic moiety and p is at least 2.

6. A coating composition according to claim 3 wherein
   (a) said reactive polymeric material comprises the reaction product of
      (i) at least one organic isocyanate compound characterized by the presence of at least two reactive isocyanate groups;
      (ii) from 30 to 100 mol percent of at least one polymeric material characterized by the presence of at least two isocyanate-reactive active hydrogen groups;
      (iii) from 70 to zero mol percent of at least one monomeric chain-extending compound characterized by the presence of at least two isocyanate-reactive active hydrogen groups; and (iv) at least one addition-polymerizable unsaturated monomeric compound having a single isocyanate-reactive active hydrogen group;
(the mol percents of ii) and iii) being based on total mols of (ii) and (iii),
said isocyanate compound (i) being present in an amount sufficient to provide an NCO:active hydrogen ratio greater than 1:1, with respect to the active hydrogen groups of (ii) and (iii);
said addition-polymerizable unsaturated monomeric compound (iv) being present in an amount sufficient to provide at least one molar equivalent of active hydrogen group per mole of available isocyanate moiety and
(b) said unsaturated free radical-induced addition-polymerizable monomeric compound comprises from 50 to 100 percent by weight, based on total weight of such monomeric compound of at least one ester having the formula

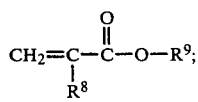

wherein $R^8$ is hydrogen or methyl and $R^9$ is an aliphatic or cycloaliphatic or cycloaliphatic group having from 6 to 18 carbon atoms.

7. A coating composition according to claim 6 containing from 0.01 to 30 parts by weight, per 100 parts by weight of free radical polymerizable material, of at least one thiol compound selected from the group consisting of monothiols and polythiols, said polythiols having a molecular weight in the range from 95 to 20,000 and having the formula

wherein $R^{10}$ is a polyvalent organic moiety and p is at least 2.

8. A coating composition according to claim 1 wherein said organic peroxide compound is characterized by the presence of at least one carbonyl group directly bonded to an aromatic nuclear carbon atom through a carbon-carbon bond and also a peroxy oxygen atom through a carbon-oxygen bond.

9. A coating composition according to claim 6 wherein the amount of said benzophenone is in the range from 25 to 99 percent by weight and the amount of said organic peroxide is in the range of 1 to 75 percent by weight, said weight percentages being based on total weight of photocatalyst system.

10. A coating system according to claim 9 wherein said organic peroxide comprises benzoyl peroxide.

11. A coating composition according to claim 9 wherein said polymeric material characterized by the presence of at least two isocyanate-reactive active hydrogen groups comprises at least one poly(alkylene oxide)polyol.

12. A coating composition according to claim 9 wherein said polymeric material characterized by the presence of at least two isocyanate-reactive active hydrogen groups comprises at least one polyetherester having at least two hydroxyl groups, such polyetherester comprising the reaction product of
(a) from 3 to 100, preferably 40 to 100, mol percent of at least one poly(alkylene oxide)polyol having at least two hydroxyl groups;
(b) from 97 to zero mol percent of at least one polymeric non-poly(alkylene oxide)polyol having at least two hydroxyl groups;
(c) from 97 to zero mol percent of at least one monomeric polyol having at least two hydroxyl groups; and
(d) from 97 to zero mol percent of at least one polyester which does not contain poly(alkylene oxide) polyol residues in its backbone;
said mol percents being based on total mols of precursor materials (II) (a)–(ii) (d); and
(e) at least one organic polycarboxylic acid characterized by the presence of at least two carboxyl groups.

13. A coating composition according to claim 3 wherein
(a) said reactive polymeric material comprises the reaction product of
(I) at least one olefinically unsaturated compound having a single reactive moiety selected from the group consisting of carboxyl and hydroxyl; and
(II) at least one organic compound having in its main chain a unit having the structure $\text{(YO)}_{\overline{n}}$; wherein Y is a hydrocarbon chain having at least one carbon atom and which can be interrupted by one or more ether oxygen atoms; n is at least 2; said organic compound having at least two hydroxyl groups or two carboxyl groups; said organic compound being selected from the group consisting of
(A) poly(alkylene oxide)polyhydroxy compounds;
(B) polyetherester polyhydroxy compounds; and
(C) polyetherester polycarboxy compounds;
said polyetherester compounds (B) and (C) comprising the reaction product of
(i) from 3 to 100 of at least one poly(alkylene oxide)polyol having at least two hydroxyl groups;
(ii) from 97 to zero mol percent of at least one polymeric non-poly(alkylene oxide)polyol, said polymeric polyol having at least two hydroxyl groups;
(iii) from 97 to zero mol percent of at least one monomeric polyol having at least two hydroxyl groups; and
(iv) from 97 to zero mol percent of at least one polyester which does not contain poly(alkylene oxide)polyol residues in its backbone;
said mol percents being based on total mols of precursor materials (i)–(iv); and
(v) at least one polycarboxylic acid characterized by the presence of at least two carboxyl groups or anhydrides of such acids; and
(b) said unsaturated free radical-induced addition-polymerizable monomeric compound comprises from 50 to 100 weight percent, based on total weight of such monomeric compound, of at least one ester having the formula

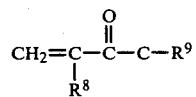

wherein $R^8$ is hydrogen or methyl and $R^9$ is an aliphatic or cycloaliphatic group having from 6 to 18 carbon atoms.

14. A coating composition according to claim 13 containing from 0.01 to 30 parts by weight, per 100 parts by weight of free-radical-polymerizable material, of at least one thiol compound selected from the group consisting of monothiols and polythiols, said polythiols having a molecular weight in the range from 95 to 20,000 and having the formula $$R^{10}(SH)_p;$$

wherein $R^{10}$ is a polyvalent organic moiety and p is at least 2.

15. A coating composition according to claim 13 wherein said organic peroxide compound is characterized by the presence of at least one carbonyl group directly bonded to an aromatic nuclear carbon atom through a carbon-carbon bond and also to a peroxy oxygen atom through a carbon-oxygen bond.

16. A coating composition according to claim 15 wherein the amount of said benzophenone is in the range from 25 to 99 percent by weight and the amount of said organic peroxide is in the range of 1 to 75 percent by weight, said weight percentages being based on total weight of photocatalyst system.

* * * * *